US007596487B2

(12) United States Patent
Gass et al.

(10) Patent No.: US 7,596,487 B2
(45) Date of Patent: Sep. 29, 2009

(54) METHOD OF DETECTING VOICE ACTIVITY IN A SIGNAL, AND A VOICE SIGNAL CODER INCLUDING A DEVICE FOR IMPLEMENTING THE METHOD

(75) Inventors: Raymond Gass, Bolsenheim (FR); Richard Atzenhoffer, Gunstett (FR)

(73) Assignee: Alcatel, Paris (FR)

( * ) Notice: Subject to any disclaimer, the term of this patent is extended or adjusted under 35 U.S.C. 154(b) by 1344 days.

(21) Appl. No.: 10/142,060

(22) Filed: May 10, 2002

(65) Prior Publication Data

US 2002/0188442 A1 Dec. 12, 2002

(30) Foreign Application Priority Data

Jun. 11, 2001 (FR) .................................. 01 07585

(51) Int. Cl.
*G10L 11/06* (2006.01)
*G10L 15/20* (2006.01)
*G10L 19/00* (2006.01)
*G10L 21/00* (2006.01)

(52) U.S. Cl. ........................ 704/208; 704/230; 704/233

(58) Field of Classification Search ................. 704/233, 704/208, 230

See application file for complete search history.

(56) References Cited

U.S. PATENT DOCUMENTS 5,410,632 A 4/1995 Hong et al.
5,583,961 A * 12/1996 Pawlewski et al. .......... 704/241
5,649,055 A 7/1997 Gupta et al.
5,819,217 A * 10/1998 Raman ....................... 704/233
5,826,230 A 10/1998 Reaves
6,275,794 B1 * 8/2001 Benyassine et al. ......... 704/207
2002/0099548 A1 * 7/2002 Manjunath et al. .......... 704/266
2004/0049380 A1 * 3/2004 Ehara et al. ................. 704/219

FOREIGN PATENT DOCUMENTS

FR 2 797 343 A1 2/2001

OTHER PUBLICATIONS

Benyassine et al., "A Robust Low Complexity Voice Activity Detection Algorithm for Speech Communication Systems", IEEE Workshop on Speech Coding for Telecommunications Proceedings, Sep. 10, 1997, pp. 97-98.*

Beritelli et al., "A Robust Voice Activity Detector for Wireless Communications Using Soft Computing," IEEE Journal on Selected Areas in Communications, vol. 16, No. 9, Dec. 1998, pp. 1818-1829.*

(Continued)

*Primary Examiner*—David R Hudspeth
*Assistant Examiner*—Justin W Rider
(74) *Attorney, Agent, or Firm*—Sughrue Mion, PLLC

(57) ABSTRACT

A method of detecting voice activity in a signal smoothes the "voice" or "noise" decision to avoid loss of speech segments. The method is particularly suitable for situations in which the noise level is high. Unlike the prior art method which favors optimizing traffic, this method favors the intelligibility of the signal reproduced after decoding. The signal to be coded is divided into frames. A "voice" or "noise" initial decision is made for each signal frame. The method makes the "voice" decision as soon as there is any increase in the energy of the signal relative to the frame preceding the current frame, even if the increase is slight. The method makes the "noise" decision only if the characteristics of the signal correspond to the characteristics of the noise for at least i consecutive frames (for example i=6). The method has applications in telephony.

10 Claims, 6 Drawing Sheets

OTHER PUBLICATIONS

Ramires et al., "Efficient voice activity detecion algorithms using long-term speech information" Speech Communication 42 (20004), pp. 271-287.*

Jongseo Sohn et al, "A statistical model-based voice activity detection" IEEE Signal Processing Letters, Jan. 1999, IEEE, USA, vol. 6, No. 1, pp. 1-3, XP002189007.

* cited by examiner

METHOD OF DETECTING VOICE ACTIVITY IN A SIGNAL, AND A VOICE SIGNAL CODER INCLUDING A DEVICE FOR IMPLEMENTING THE METHOD

CROSS-REFERENCE TO RELATED APPLICATIONS

This application is based on French Patent Application No. 01 07 585 filed Jun. 11, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a voice signal coder including an improved voice activity detector, and in particular a coder conforming to ITU-T Standard G.729A, Annex B.

2. Description of the Prior Art

A voice signal contains up to 60% silence or background noise. To reduce the quantity of information to be transmitted, it is known in the art to discriminate between voice signal portions that really contain wanted signals and portions that contain only silence or noise, and to code them using respective different algorithms, each portion that contains only silence or noise being coded with very little information, representing the characteristics of the background noise. This kind of coder includes a voice activity detector that effects the discrimination in accordance with the spectral characteristics and the energy of the voice signal to be coded (calculated for each signal frame).

The voice signal is divided into digital frames corresponding to a duration of 10 ms, for example. For each frame, a set of parameters is extracted from the signal. The main parameters are autocorrelation coefficients. A set of linear prediction coding coefficients and a set of frequency parameters are then deduced from the autocorrelation coefficients. One step of the method of discriminating between voice signal portions that really contain wanted signals and portions that contain only silence or noise compares the energy of a frame of the signal with a threshold. A device for calculating the value of the threshold adapts the value of the threshold as a function of variations in the noise. The noise affecting the voice signal comprises electrical noise and background noise. The background noise can increase or decrease significantly during a call.

Also, noise frequency filtering coefficients must also be adapted to suit the variations in the noise.

The paper "ITU-T Recommendation G729 Annex B: A Silence Compression Scheme for Use With G729 Optimized for V.70 Digital Simultaneous Voice and Data Applications", by Adil Benyassine et al., IEEE Communication Magazine, September 1997, describes a coder of the above kind.

The decoder which decodes the coded voice signal must use alternately two decoder algorithms respectively corresponding to signal portions coded as voice and signal portions coded as silence or background noise. The change from one algorithm to the other is synchronized by the information coding the periods of silence or noise.

Prior art codes that implement ITU-T Standard G.729A, Annex B, 11/96, are no longer capable of distinguishing between a wanted signal and noise if the noise level exceeds 8 000 steps on the quantization scale defined by the standard. This results in many unnecessary transitions in the voice activity detection signal and thus in the loss of wanted signal portions.

A prior art solution described in contribution G.723.1 VAD consists of totally inhibiting voice activity detection in the coder when the signal-to-noise ratio is below a predetermined value. This solution preserves the integrity of the wanted signal but has the drawback of increasing the traffic.

The object of the invention is to propose a more efficient solution, which preserves the efficiency of voice activity detection in terms of traffic, but which does not degrade the quality of the signal reproduced after decoding.

SUMMARY OF THE INVENTION

The invention consists of a method of detecting voice activity in a signal divided into frames, the method including a step of smoothing a "voice" or "noise" initial decision made for each frame, the smoothing step including a step that makes a "voice" final decision for a frame n if:

- the initial decision for frame n is "voice"; and
- the final decision for frame n−2 was "noise"; and
- the energy of frame n−i was greater than that of frame n−2; and
- the energy of frame n is greater than the energy of frame n−2.

The above method avoids an undesirable "noise" to "voice" transition in the event of a transient increase in energy during only a frame n, because the smoothing function takes account of the final decision made for the frame n−1 preceding the current frame n, to decide on a "noise" to "voice" transition.

In a preferred embodiment of the invention, if a "voice" final decision has been made for frame n, the method according to the invention further prevents any "noise" final decision for frames n+1 to n+i, where i is an integer defining an inertia period.

The above method avoids the phenomenon of loss of speech segments because the smoothing function has an inertia corresponding to the duration of i frames for the return to a "noise" decision.

The invention further consists of a voice signal coder including smoothing means for implementing the method according to the invention.

The invention will be better understood and other features of the invention will become more apparent from the following description and the accompanying drawings.

DETAILED DESCRIPTION OF THE PREFERRED EMBODIMENT

Figure 1:
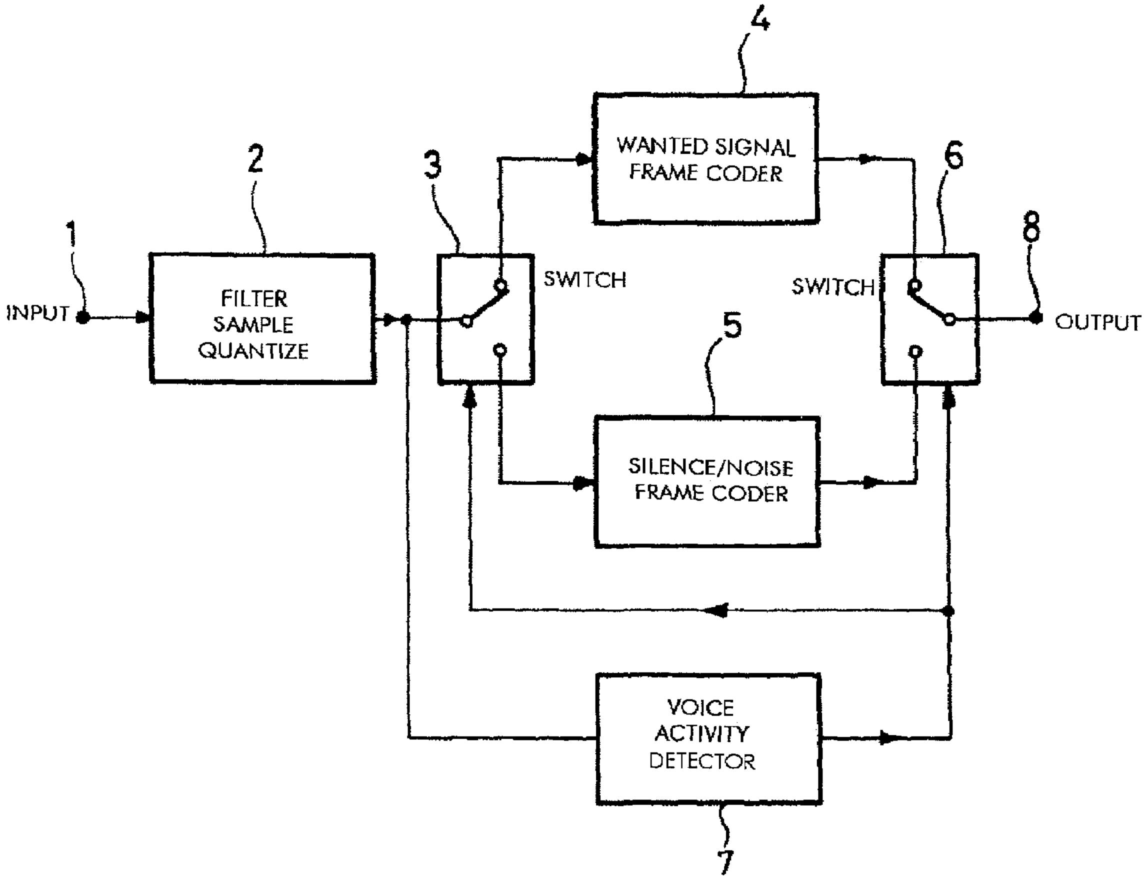
FIG. 1 is a functional block diagram of one embodiment of a coder for implementing the method according to the invention.

The embodiment of a coder shown in the FIG. 1 functional block diagram includes:

- an input 1 receiving an analog voice signal to be coded;
- a circuit 2 for filtering, sampling, and quantizing the voice signal and building frames;
- a switch 3 having an input connected to the output of the circuit 2 and two outputs;
- a circuit 4 for coding frames considered to represent a wanted signal and having an input connected to a first output of the switch 3;
- a circuit 5 for coding frames considered to represent silence or noise, and having an input connected to a second output of the switch 3;
- a second switch 6 having first and second inputs respectively connected to an output of the circuit 4 and to an output of the circuit 5, and an output 8 constituting the output of the coder; and
- a voice activity detector 7 having an input connected to the output of the circuit 2 and an output connected in particular to a control input of each of the switches 3 and 6, in order to select the coded frames corresponding to the recognized content of the voice signal: either wanted signal or silence (or noise).

When the voice signal is a wanted signal, the coder supplies a frame every 10 ms. When the voice signal consists of silence (or noise), the coder supplies a single frame at the beginning of the period of silence (or noise).

In practice, the above kind of coder can be implemented by programming a processor. In particular, the method according to the invention can be implemented by software whose implementation will be evident to the person skilled in the art.

Figure 2:
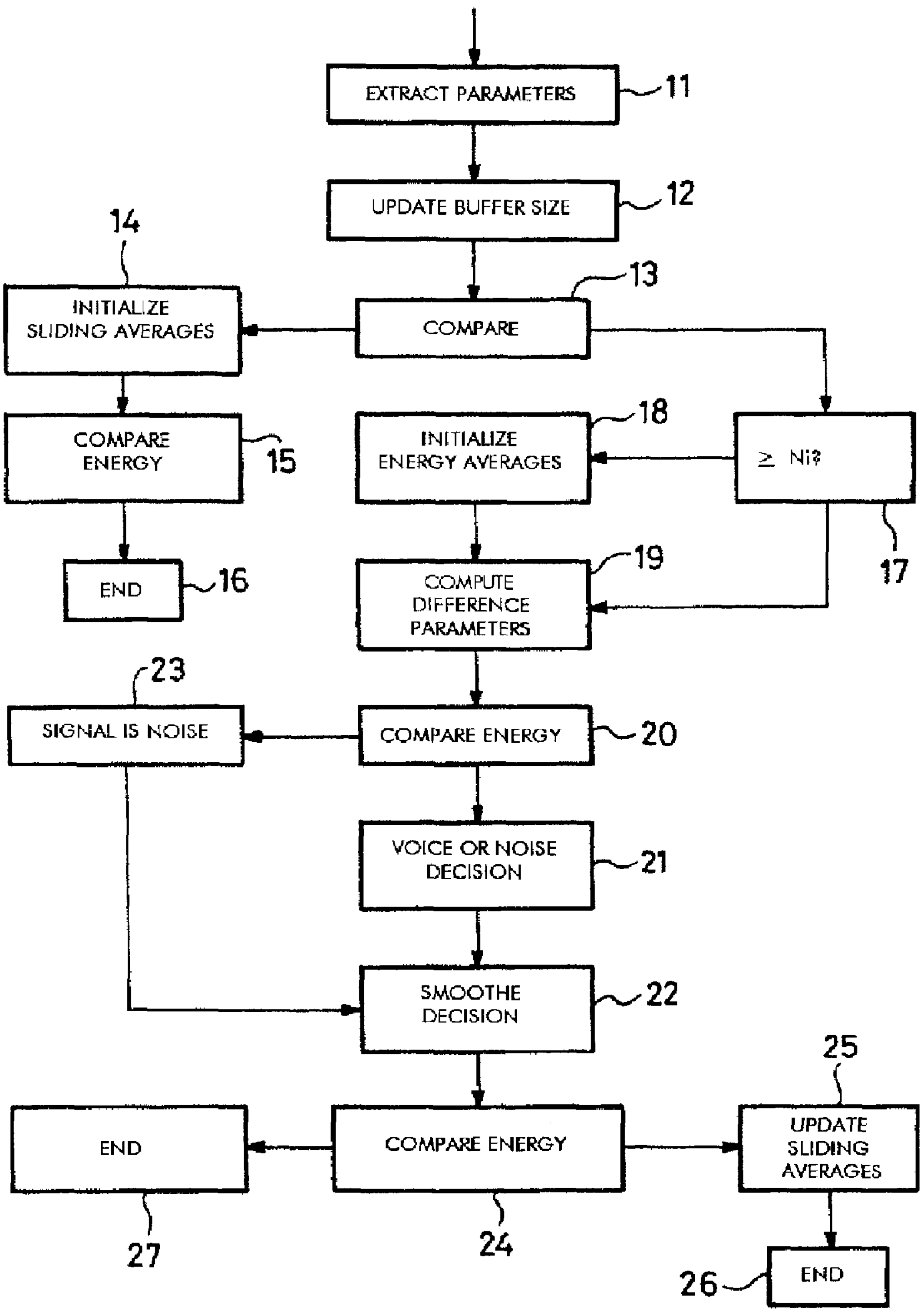
FIG 2 PRIOR ART
FIG. 2 shows the "voice"/"noise" decision flowchart of the coding method known from Standard G.729, Annex B, 11/96.

FIG. 2 shows the flowchart of the "voice" or "noise" decision made by the coding method known from Standard G.729, Annex B, 11/96. The method is applied to digitized signal frames having a fixed duration of 10 ms.

A first step 11 extracts four parameters for the current frame of the signal to be coded: the energy of that frame throughout the frequency band, its energy at low frequencies, a set of spectrum coefficients, and the zero crossing rate.

The next step 12 updates the minimum size of a buffer memory.

The next step 13 compares the number of the current frame with a predetermined value Ni:

- If the number of the current frame is less than Ni:
  - The next step 14 initializes the sliding average values of the parameters of the signal to be coded: the spectrum coefficients, the average energy throughout the band, the average energy at low frequencies, and the average zero crossing rate.
  - The next step 15 compares the energy of the frame to a predetermined threshold value, and decides that the signal is voice if the energy of the frame is greater than that value or that the signal is noise if the energy of the frame is less than that value. The processing of the current frame then reaches its end 16.
- If the number of the current frame is not less than Ni, the next step 17 determines if it is equal to or greater than Ni:
  - If it is equal to Ni, the next step 18 initializes the value of the average energy of the noise throughout the band and the value of the average energy of the noise at low frequencies.
  - If it is greater than Ni:
    - the next step 19 computes a set of difference parameters by subtracting the current value of a frame parameter from the sliding average value of that frame parameter, the latter being representative of noise. These difference parameters are: the spectral distortion, the energy difference throughout the band, the energy difference at low frequencies, and the zero crossing rate difference.
    - The next step 20 compares the energy of the frame to a predetermined threshold value:
      - If it is not less than that value, a step 21 makes a "voice" or "noise" initial decision based on a plurality of criteria, and then a step 22 "smoothes" that decision to avoid too numerous changes of decision.
      - If it is less than or equal to that value, a step 23 decides that the signal is noise, after which the step 22 "smoothes" that decision.
  - After the smoothing step 22, the next step 24 compares the energy of the current frame with an adaptive threshold equal to the sliding average of the energy throughout the band, plus a constant:
    - If it is greater than the threshold value, the next step 25 updates the values of the sliding averages of the parameters representing the noise, after which the processing of the current frame reaches its end 26.
    - If it is not greater than the threshold value, the processing of the current frame reaches its end 27.

Figure 3:
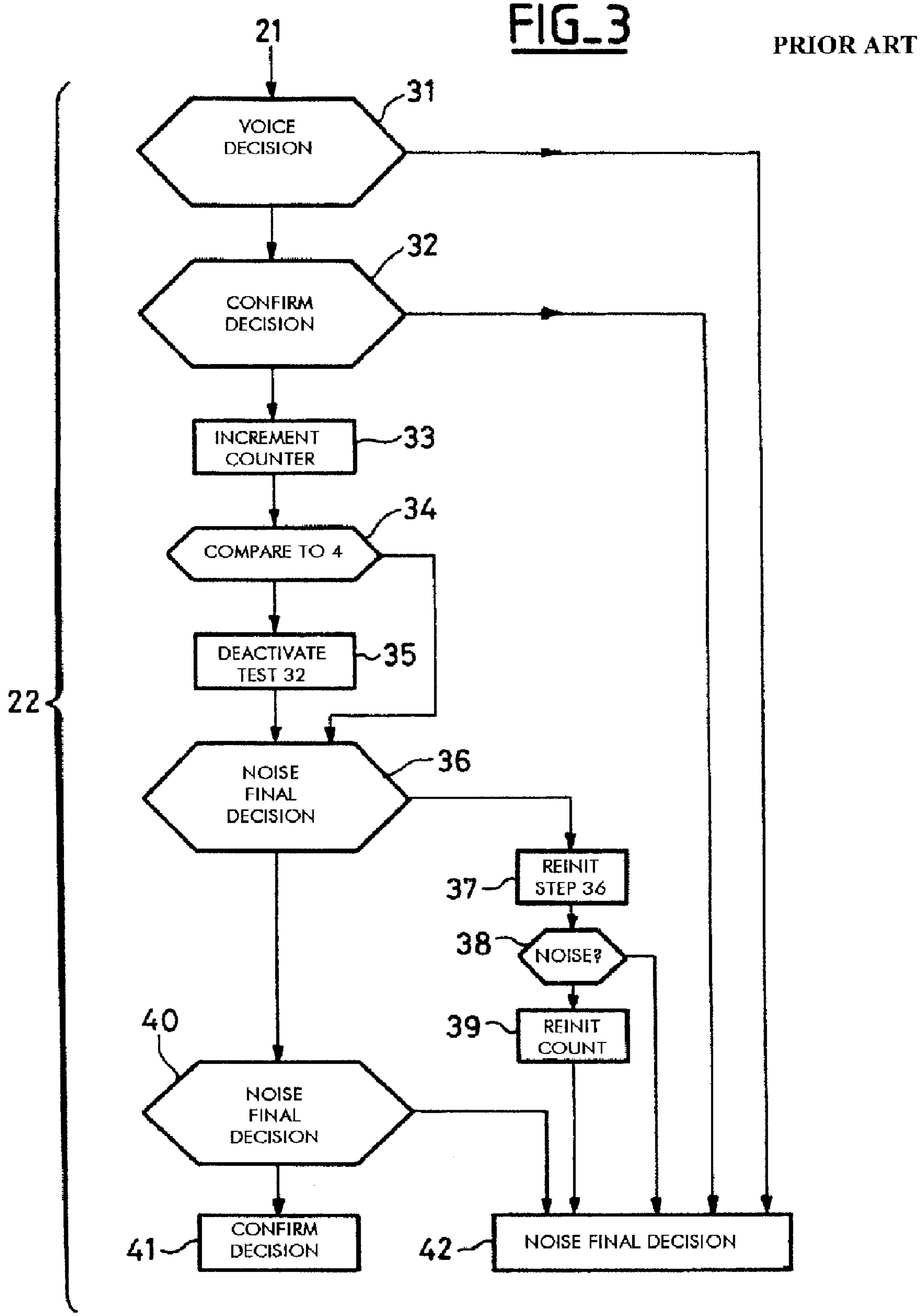
FIG 3 PRIOR ART
FIG. 3 shows in more detail the operations of smoothing the voice activity detection signal in the coding method known from Standard G.729, Annex B, 11/96.

FIG. 3 shows in more detail the voice activity detection signal smoothing operations of the coding method known from Standard G.729, Annex B, 11/96. This smoothing comprises four steps, which follow on from the "voice" or "noise" initial decision 21 based on a plurality of criteria:

A first step 31 makes the "voice" decision if:

- the decision for the preceding frame was "voice", and
- the average energy of the current frame is greater than the sliding average of the energy of the preceding frames plus a constant, in other words if the energy of the current frame is clearly greater than the average energy of the noise.

Otherwise, the "noise" final decision 42 is made.

A second step 32 to 35 consists of a test 32 to confirm the "voice" decision if:

- the decision for the preceding two frames was "voice", and
- the average energy of the current frame is greater than the sliding average of the energy of the preceding frame plus a constant, in other words if the energy has not decreased much from the preceding frame to the current frame.

This second step further increments a counter (operation 33), then compares its content to the value 4 (operation 34), and then deactivates the test 32 for the next frame (operation 35) if the current frame is the fourth frame in a row for which the decision is "voice". If the "voice" decision is not confirmed, the "noise" final decision 42 is made.

A third step 36 to 39 consists of a test 36 for making the "noise" final decision 42 if:

- A "noise" decision has been made for the ten frames preceding the current frame (the "voice" decision having been made for the latter in steps 31-35).

The energy of the current frame is less than the energy of the preceding frame plus a constant, in other words, the energy has not greatly increased from the preceding frame to the current frame.

This third step further reinitializes the test 36 (operation 37) and reinitializes the counting of frames (operation 39) if the current frame is the tenth frame in a row for which the decision is "noise" (test 38).

A fourth step consists of a test 40 to make the "noise" final decision 42 if the energy of the current frame is less than the sum of the sliding average of the energy of the preceding frames plus a constant equal to 614. In other words, the "voice" decision is finally confirmed (operation 41) only if the energy of the frame is significantly greater than the sliding average of the energy of the preceding frames. Otherwise, the "noise" final decision 42 is made.

This fourth step 40 (final decision) produces wrong "noise" decisions if the signal is very noisy. This is because this step 40 decides that the signal is noise without taking account of preceding decisions, but based only on the energy difference between the current frame and the background noise, represented by the value of the sliding average of the energy of the preceding frames, plus the constant 614. In fact, when the background noise is high, the threshold consisting of the constant 614 is no longer valid.

The method according to the invention differs from the method known from Standard G.279.1, Annex B, 11/96 at the level of the smoothing steps.

Figure 4:
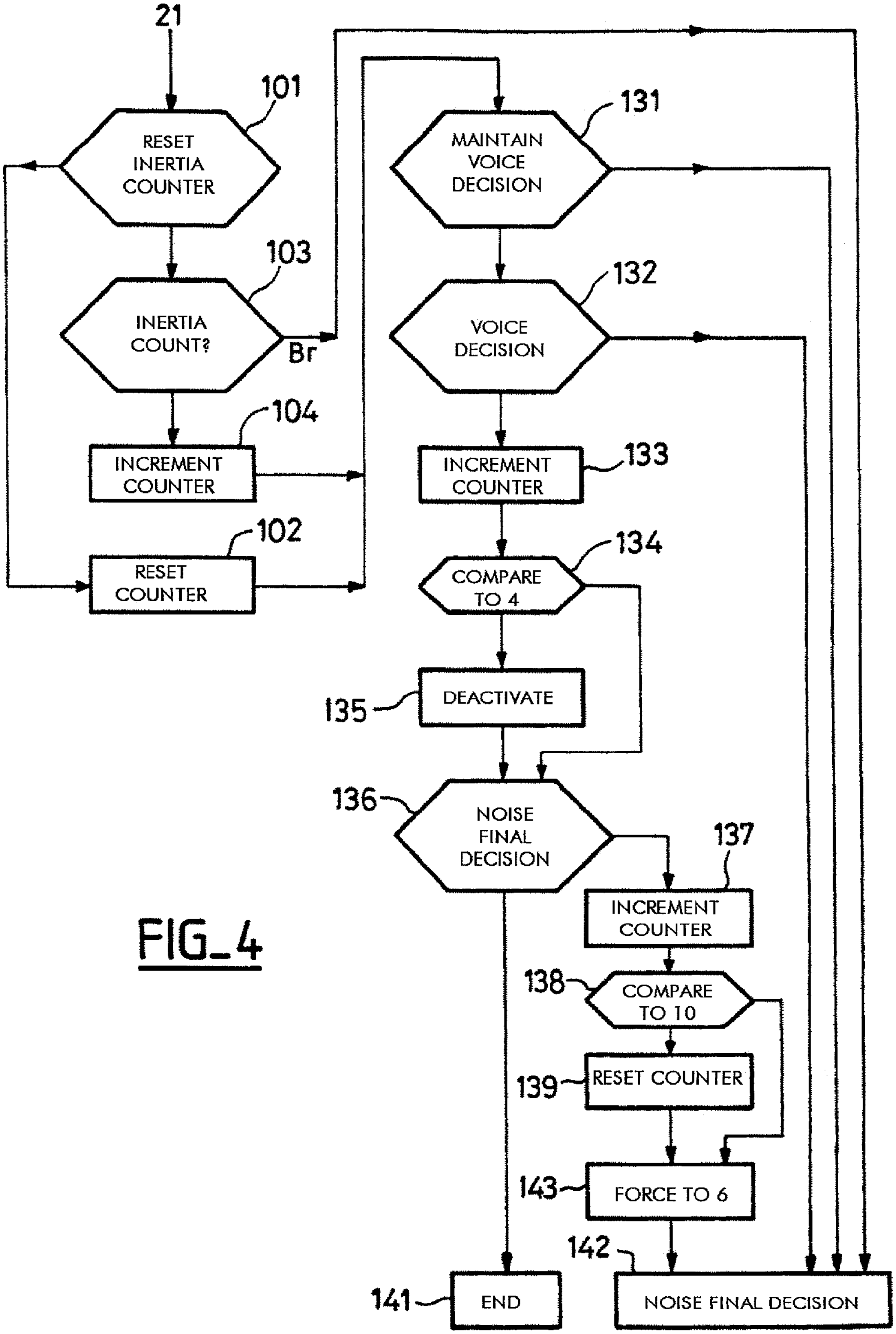
FIG. 4 shows the flowchart of voice activity detection signal smoothing in one embodiment of the method according to the invention.

FIG. 4 shows the flowchart of voice activity detection signal smoothing in one embodiment of the method according to the invention.

The smoothing comprises four steps, which follow on from the "voice" or "noise" initial decision 21 based on a plurality of criteria. Of these four steps, three (tests 131, 132, 136) are analogous to three steps described above (tests 31, 32, 36), the fourth step 40 previously described is eliminated, and a preliminary step is added before the first step 31 described above. Inertia counting is added to obtain an inertia with a duration equal to five times the duration of a frame, for example, before changing from the "voice" decision to the "noise" decision when the energy of the frame has become weak. This duration is therefore equal to 50 ms in this example. The inertia counting is active only if the average energy of the noise becomes greater than 8 000 steps of the quantizing scale defined by Standard G.279.1, Annex B, 11/96.

The additional preliminary step 101 to 104 consists in:

If the initial decision of step 21 is "voice", resetting to 0 the inertia counter (operation 102) and finally proceeding to test 131.

If the initial decision of step 21 is "noise", determining if the energy of the current frame is greater than a fixed threshold value, and determining if the content of the inertia counter is less than 6 and greater than 1 (operation 103). Then:

Either making the "voice" decision (contradicting the original decision) if both conditions are satisfied, and then incrementing the inertia counter by one unit (operation 104), and finally proceeding to test 131.

Or making the "noise" final decision 142 if either condition is not satisfied.

The first step consists of a test 131 (analogous to the test 31) which maintains the "voice" decision if the preceding decision was "voice" and the average energy of the current frame is greater than the sliding average of the energy of the preceding frames plus a fixed constant.

The second step 132 to 135 (analogous to the step 32 to 35) consists in making the "voice" decision if:

the decision for the preceding two frames was "voice", and the average energy of the current frame is greater than the sliding average of the energy of the preceding frame plus a constant, in other words if the energy has not decreased much from the preceding frame to the current frame.

This second step 132 to 135 further deactivates this test for the next frame if the current frame is the fourth frame in a row for which the decision is "voice" (incrementing a counter (operation 133), comparing its content with the value 4 (operation 134), and deactivation (operation 135) if the value 4 is reached).

The third step 136 to 139, 143 (differing little from the step 36 to 39) makes the "noise" final decision 142 if:

a "noise" decision was made for the last ten frames; and the energy of the current frame is less than the energy of the preceding frame plus a constant, in other words if the energy has not increased greatly from the preceding frame to the current frame.

This third step further consists in reinitializing the test 136 and reinitializing the counting of frames if the current frame is the tenth frame in a row for which the decision is "noise" (incrementing a counter (operation 137), comparing the content of the counter with the value 10 (operation 138), resetting the counter to 0 (operation 139) if the value 10 is reached). The third step is modified compared to the prior art method previously described because it further forces the inertia counter to the value 6 (operation 143) to prevent any interaction between the test 136 and the inertia counter.

There is no fourth step analogous to the step 40.

Figure 5:
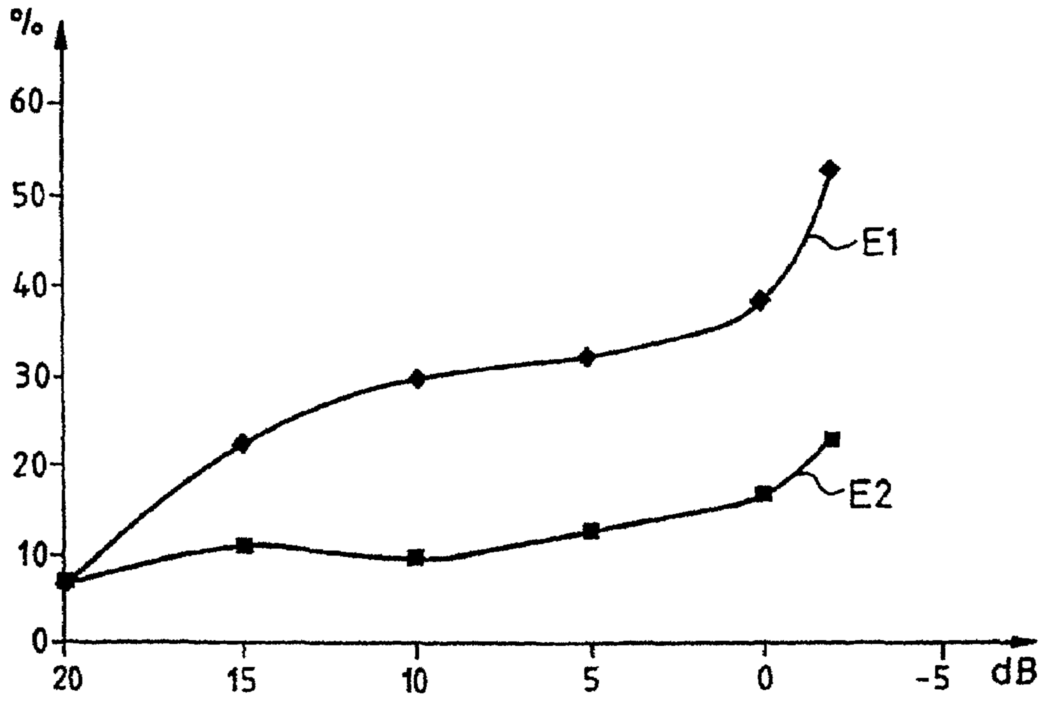
FIG. 5 shows the percentage errors for the prior art method and the method according to the invention, for different values of the signal-to-noise ratio.

In FIG. 5 the curves E1 and E2 respectively represent the percentage errors for the prior art method and for the method according to the invention, for different values of the signal-to-noise ratio.

Figure 6:
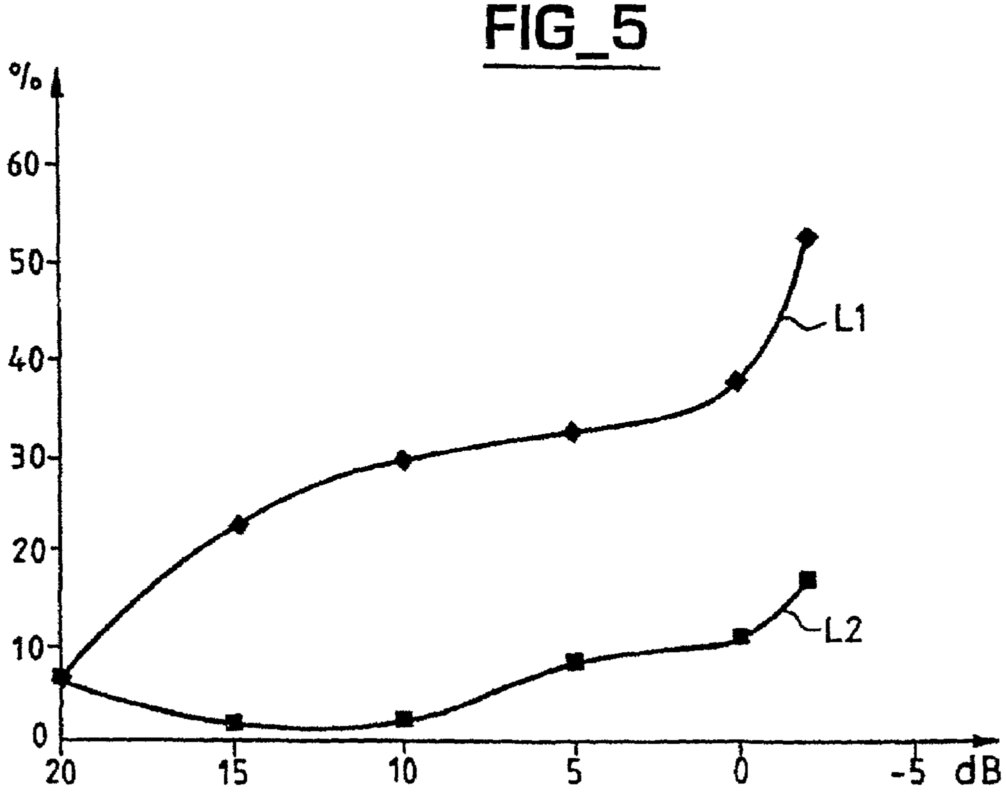
FIG. 6 shows the percentage speech losses for the prior art method and the method according to the invention, for different values of the signal-to-noise ratio.

In FIG. 6 the curves L1 and L2 respectively represent the percentage speech losses for the prior art method and for the method according to the invention, for different values of the signal-to-noise ratio.

They show that voice activity detection is greatly improved in a noisy environment. The global percentage error is reduced and, most importantly, the percentage speech loss is considerably reduced. The integrity of the speech is preserved and the conversation remains intelligible.

Figure 7:
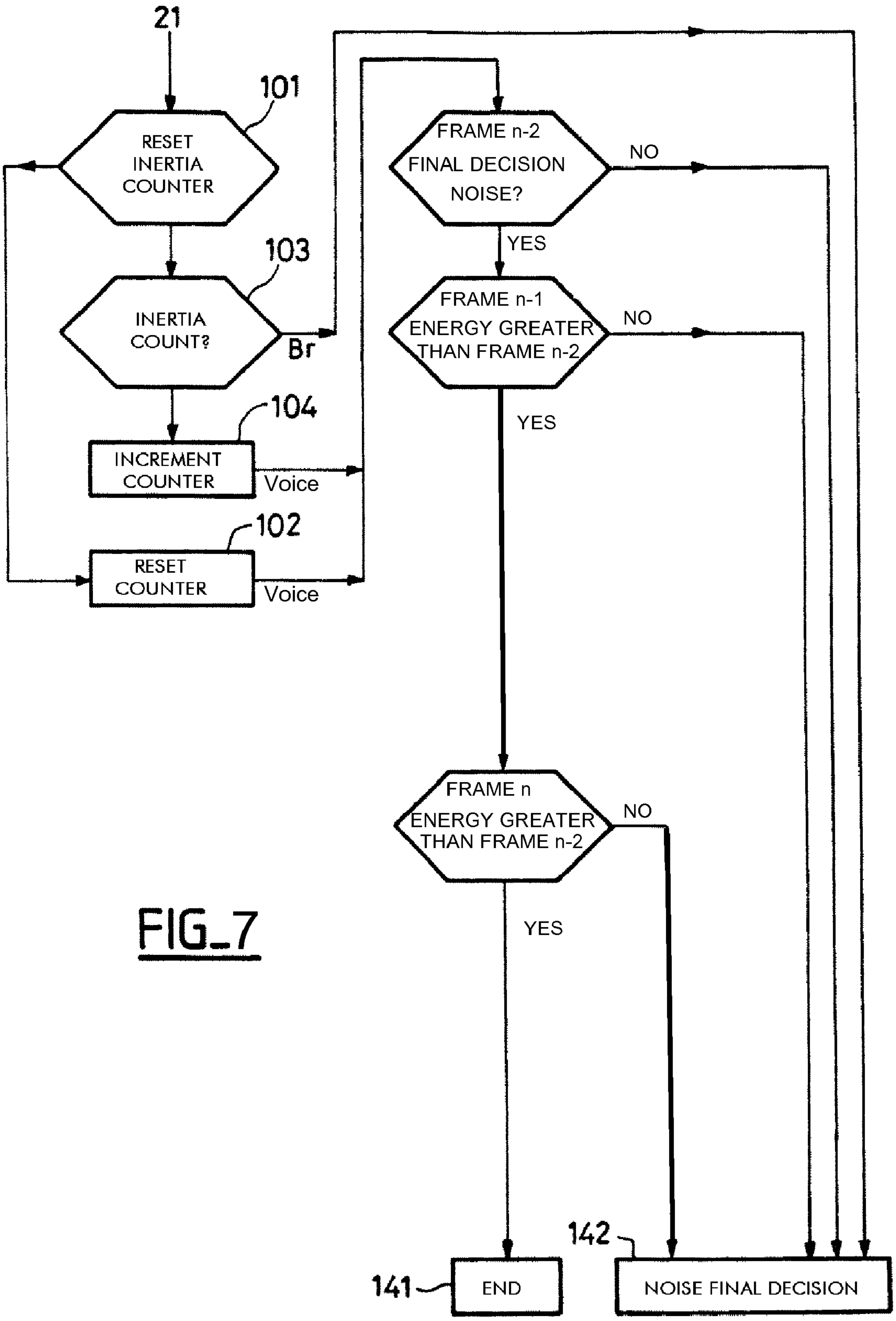
FIG. 7 shows the flowchart of the voice activity detection signal smoothing according to an alternative embodiment of the invention.

FIG. 7 illustrates a flow chart according to an alternative embodiment of smoothing according to the present invention, where the smoothing makes a "voice" final decision for a frame n if:

the initial decision for frame n is "voice"; and the final decision for frame n−2 was "noise"; and the energy of frame n−1 was greater than that of frame n−2; and the energy of frame n is greater than the energy of frame n−2.

There is claimed:

1. A method of operating a voice signal coder to detect voice activity in a signal divided into frames, said method comprising said voice signal coder classifying a frame as "voice" or noise by first making an initial decision with respect to a frame and then smoothing the initial decision made for each frame, said smoothing step including a step that makes a "voice" final decision for a frame n if:

the initial decision for frame n is "voice"; and the final decision for frame n−2 was "noise"; and the energy of frame n−1 was greater than that of frame n−2; and the energy of frame n is greater than the energy of frame n−2.

2. The method claimed in claim 1 wherein a "noise" final decision is prevented for frames n+1 to n+i, where i is an integer defining an inertia period, if a "voice" final decision has been made for frame n.

3. The method claimed in claim 1 wherein said smoothing step includes a step of, for a frame n:

if the initial decision is "voice", resetting to 0 an inertia counter;

if the initial decision is "noise", determining if the energy of frame n is greater than a threshold value and determining if the content of said inertia counter is less than a fixed threshold and greater than 1; then:

either making the "voice" decision if the three conditions are satisfied, and then incrementing said inertia counter by one unit;

or making the "noise" decision if the energy of frame n is not greater than said threshold value or if the content of said inertia counter is not less than said fixed threshold and greater than 1.

4. A voice signal coder including a voice activity detector, said signal being divided into frames and said detector including means for smoothing a "voice" or "noise" initial decision made for each frame, wherein said smoothing means include means for making a "voice" final decision for a frame n if:

the initial decision for frame n is "voice"; and the final decision for frame n−2 was "noise"; and the energy of frame n−1 was greater than that of frame n−2; and the energy of frame n is greater than the energy of frame n−2.

5. The coder claimed in claim 4 wherein said smoothing means include means for preventing a "noise" final decision for frames n+1 to n+i, where i is an integer defining an inertia period, if a "voice" final decision has been made for frame n.

6. The coder claimed in claim 4 wherein said smoothing means include means for:

if the initial decision for a frame n is "voice", resetting to 0 an inertia counter;

if the initial decision is "noise", determining if the energy of frame n is greater than a threshold value and determining if the content of said inertia counter is less than a fixed threshold and greater than 1; then:

either making the "voice" decision if the three conditions are satisfied, and then incrementing said inertia counter by one unit;

or making the "noise" decision if the energy of frame n is not greater than said threshold value or if the content of said inertia counter is less than said fixed threshold and greater than 1.

7. A method of operating a voice signal coder to detect voice activity in a signal divided into frames, said method including a step of said voice signal coder smoothing a "voice" or "noise" initial decision made for each frame, said smoothing step including a step that makes a "voice" final decision or a "noise" final decision for a frame n;

wherein a "noise" final decision is prevented for frames n+1 to n+i, where i is an integer defining an inertia period, if a "voice" final decision has been made for frame n and an average energy of the noise is greater than a predetermined value.

8. The method claimed in claim 7 wherein said smoothing step includes a step of, for a frame n:

if the initial decision is "voice", resetting to 0 an inertia counter;

if the initial decision is "noise", determining if the energy of frame n is greater than a threshold value and determining if the content of said inertia counter is less than a fixed threshold and greater than 1; then:

either making the "voice" decision if the three conditions are satisfied, and then incrementing said inertia counter by one unit;

or making the "noise" decision if the energy of frame n is not greater than said threshold value or if the content of said inertia counter is not less than said fixed threshold and greater than 1.

9. A voice signal coder including a voice activity detector, said signal being divided into frames and said detector including means for smoothing a "voice" or "noise" initial decision made for each frame, wherein said smoothing means include means for making a "voice" final decision or a "noise" final decision for a frame n;

wherein said smoothing means include means for preventing a "noise" final decision for frames n+1 to n+i, where i is an integer defining an inertia period, if a "voice" final decision has been made for frame n.

10. The coder claimed in claim 9 wherein said smoothing means include means for:

if the initial decision for a frame n is "voice", resetting to 0 an inertia counter;

if the initial decision is "noise", determining if the energy of frame n is greater than a threshold value and determining if the content of said inertia counter is less than a fixed threshold and greater than 1; then:

either making the "voice" decision if the three conditions are satisfied, and then incrementing said inertia counter by one unit;

or making the "noise" decision if the energy of frame n is not greater than said threshold value or if the content of said inertia counter is not less than said fixed threshold and greater than 1.

* * * * *

UNITED STATES PATENT AND TRADEMARK OFFICE

CERTIFICATE OF CORRECTION

PATENT NO. : 7,596,487 B2
APPLICATION NO. : 10/142060
DATED : September 29, 2009
INVENTOR(S) : Gass et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2108 days.

Signed and Sealed this

Twenty-eighth Day of September, 2010

David J. Kappos

*Director of the United States Patent and Trademark Office*